United States Patent
Villines

(10) Patent No.: US 9,174,329 B1
(45) Date of Patent: Nov. 3, 2015

(54) PLUNGER REPOSITIONING SYSTEM

(71) Applicant: Iron Horse Industries, LLC, Weatherford, OK (US)

(72) Inventor: Benjamin K. Villines, Weatherford, OK (US)

(73) Assignee: Iron Horse Industries, LLC, Weatherford, OK (US)

( * ) Notice: Subject to any disclaimer, the term of this patent is extended or adjusted under 35 U.S.C. 154(b) by 0 days.

(21) Appl. No.: 14/475,213

(22) Filed: Sep. 2, 2014

Related U.S. Application Data

(60) Provisional application No. 62/036,941, filed on Aug. 13, 2014.

(51) Int. Cl.
*B25B 17/00* (2006.01)
*F04B 53/16* (2006.01)
*B25B 27/00* (2006.01)
*F16H 25/20* (2006.01)

(52) U.S. Cl.
CPC ........... *B25B 27/0007* (2013.01); *F04B 53/164* (2013.01); *F04B 53/168* (2013.01); *F16H 25/20* (2013.01)

(58) Field of Classification Search
CPC Y10T 29/53913; B23B 23/04; B65H 75/242; B65H 75/246; B25B 27/0007; F04B 53/168
USPC .................. 269/47, 50, 52; 29/271; 279/2.19
See application file for complete search history.

(56) References Cited

PUBLICATIONS

Dixie Iron Works, Ltd., MSI Fluid End Training, pp. 1-13, May 25, 2013, United States. Available at https://web.archive.org/web/20130525182033/http://www.diwmsi.com/support/pdfs/MSIPumpSchoolFEA.pdf.

*Primary Examiner* — Lee D Wilson
*Assistant Examiner* — Jamal Daniel
(74) *Attorney, Agent, or Firm* — Gary Peterson

(57) ABSTRACT

A tool for repositioning a plunger is formed from a pair of concentric and relatively rotatable shafts. The inner and tubular outer shafts respectively support enlarged forward and rear head elements. The shafts are relatively rotatable between a first position, in which the cross-sectional profiles of the head elements are aligned, and a second position, in which the cross-sectional profiles of the head elements are in skewed opposition. A ball detent mechanism at the interface between the forward and rear head elements permits accurate location of the first and second positions. The tool is used with a tubular collar element having a stem section and an enlarged flange section, and a disk-shaped platform element having a centrally disposed and internally threaded opening. The threaded opening in the platform element receives the externally threaded outer shaft of the tool.

21 Claims, 14 Drawing Sheets

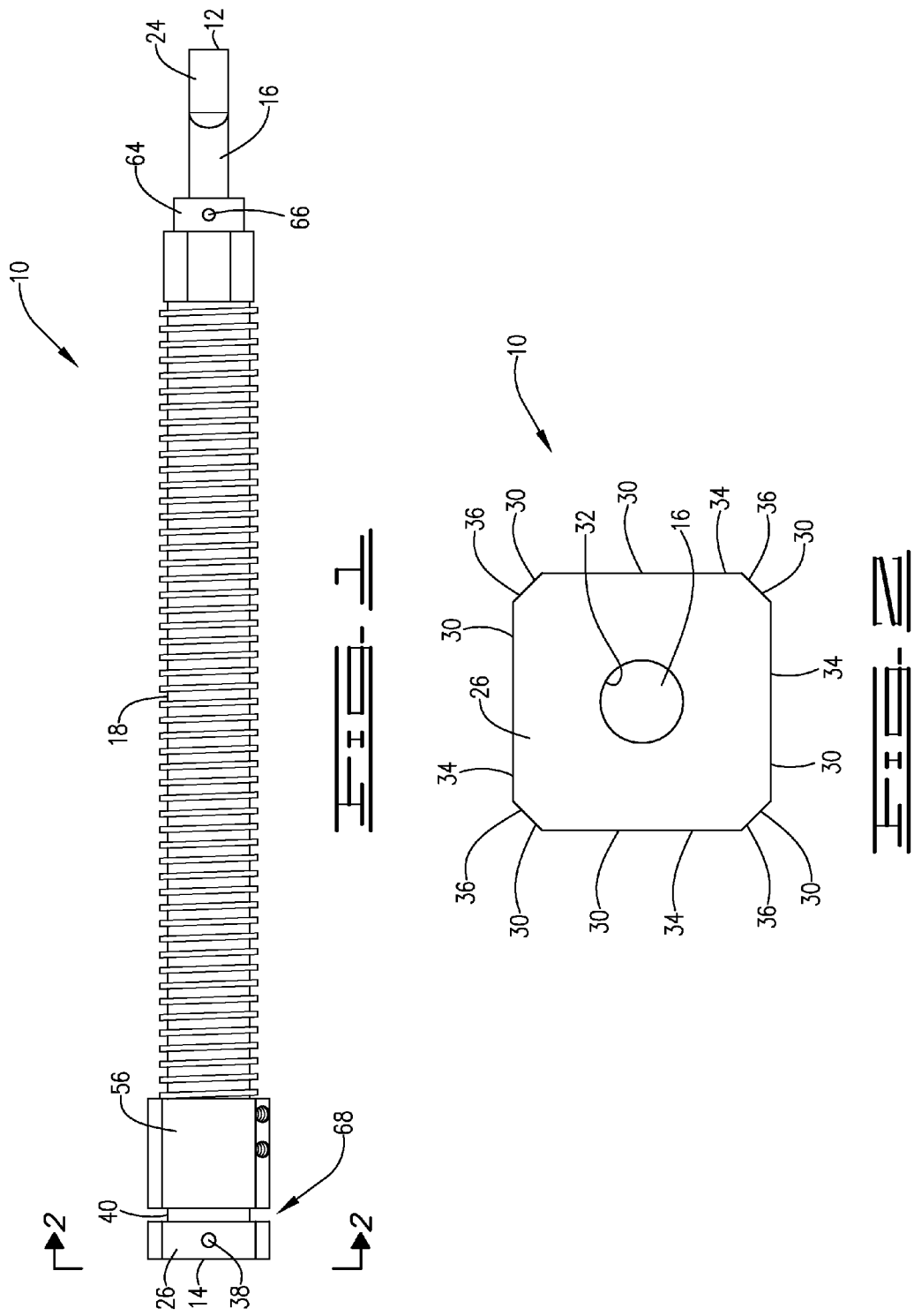

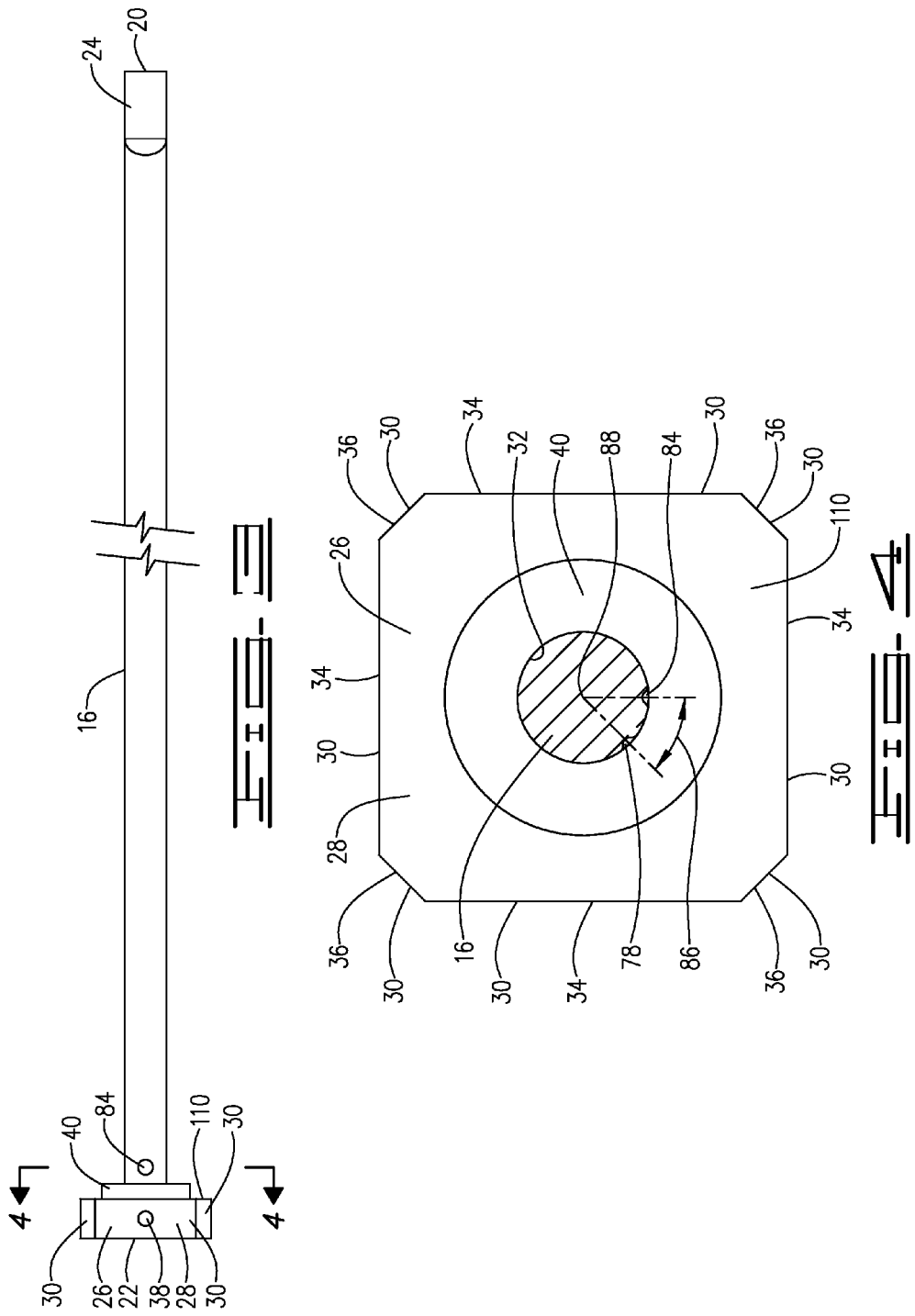

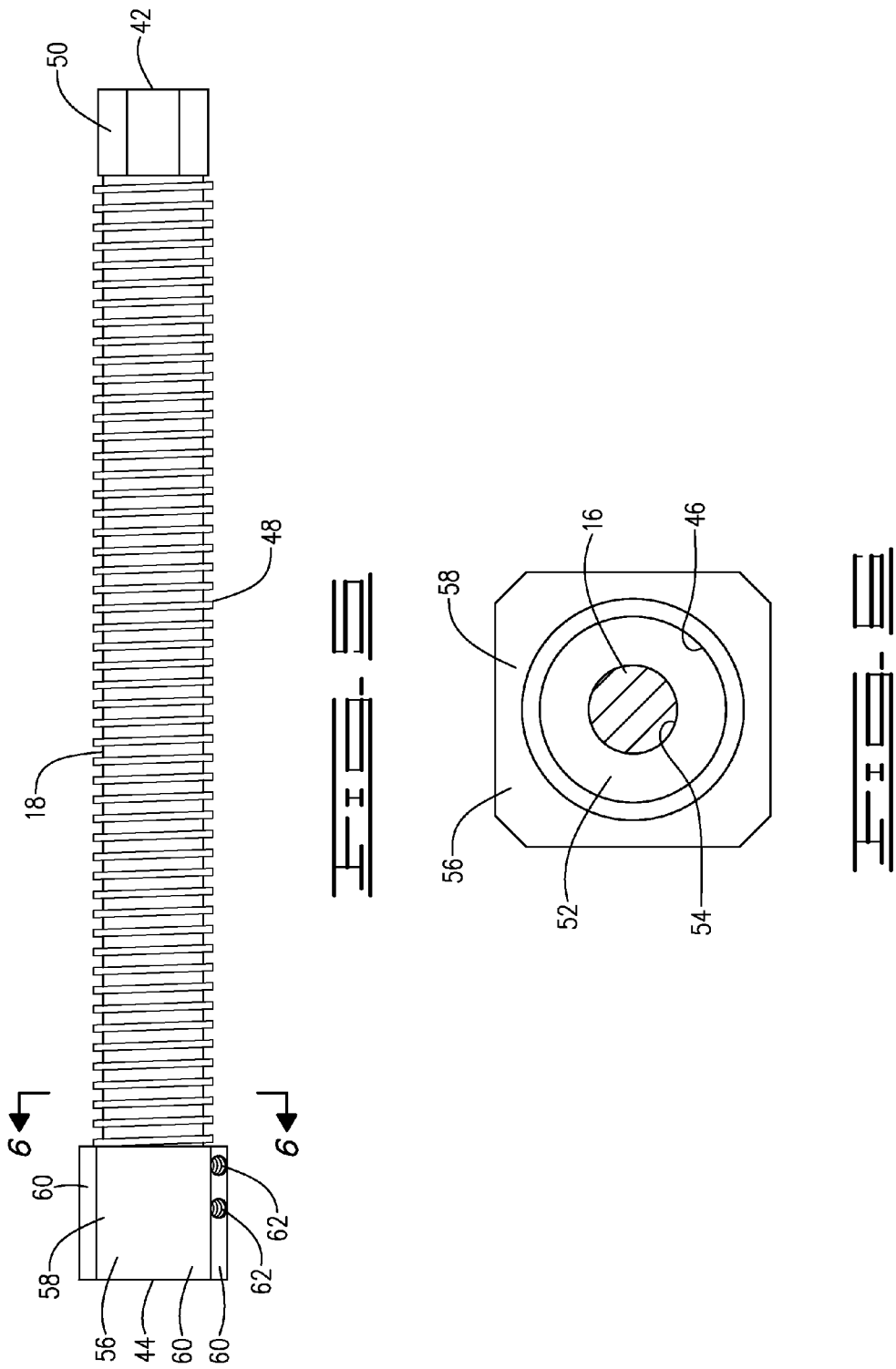

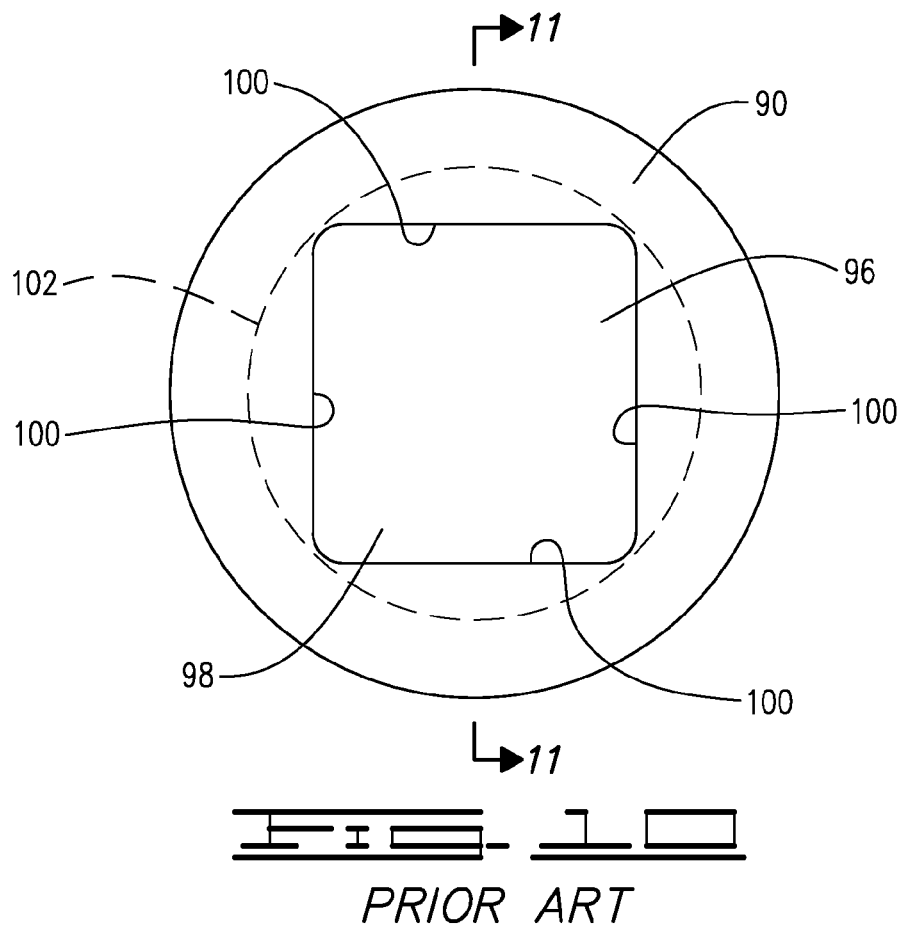
PRIOR ART
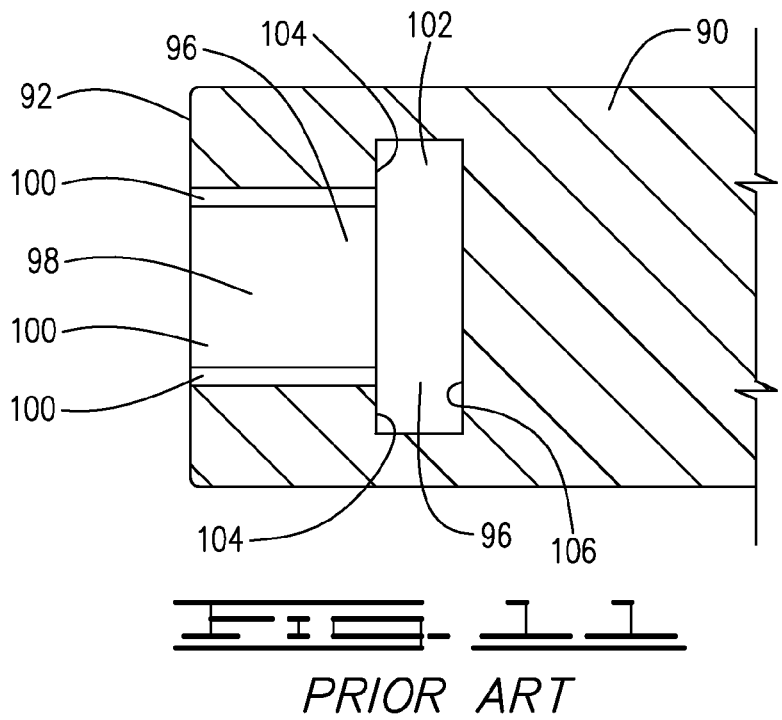
PRIOR ART

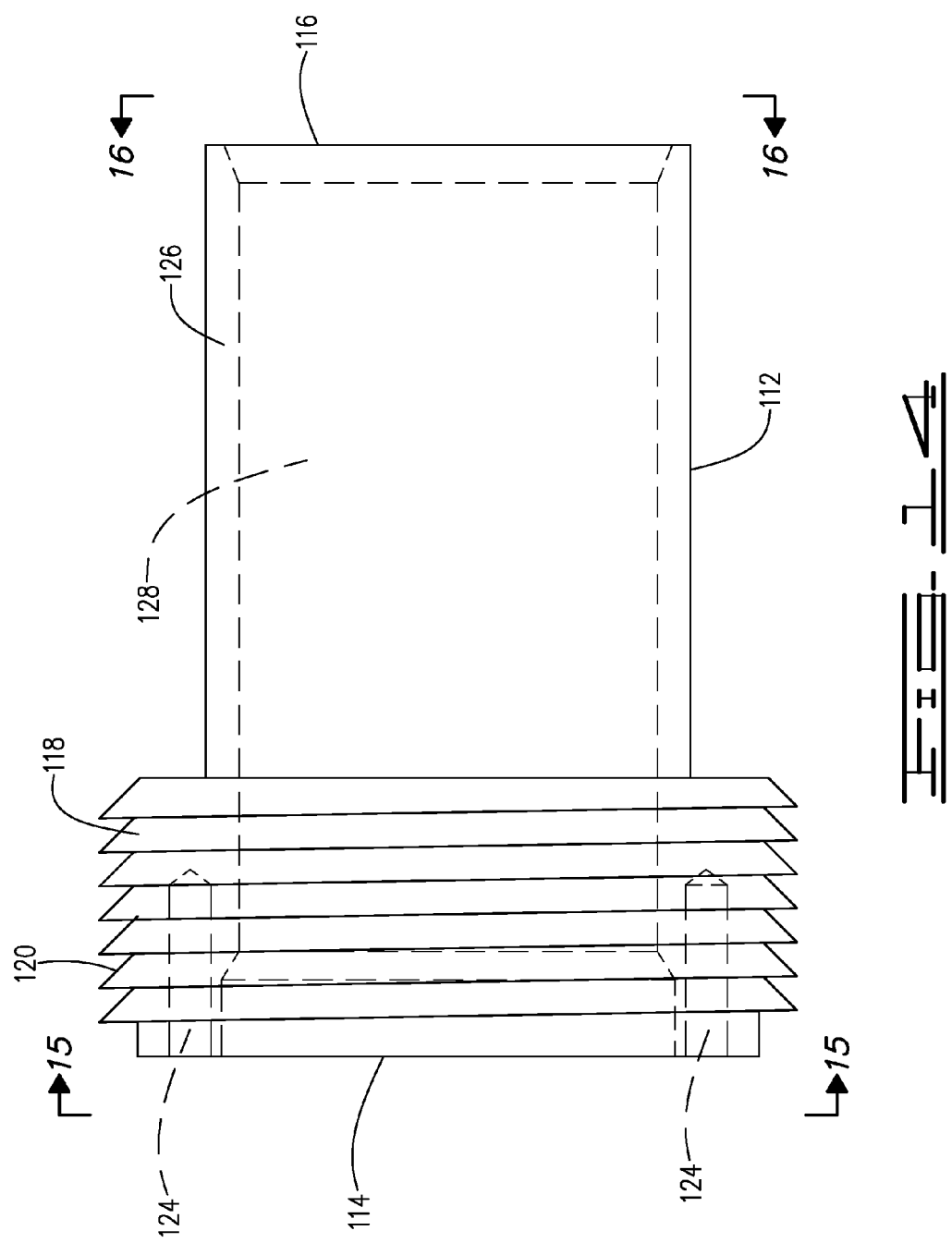

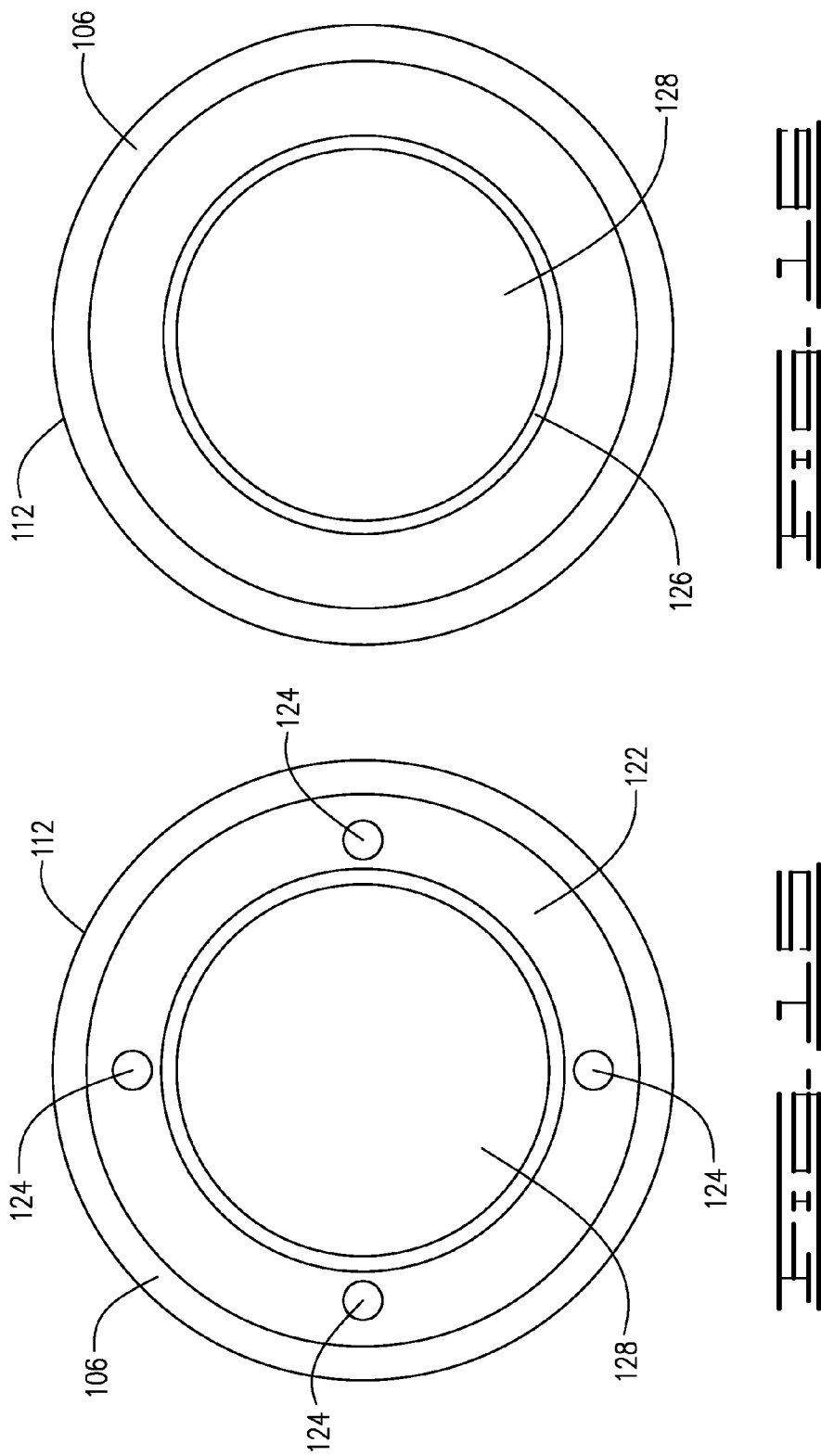

PLUNGER REPOSITIONING SYSTEM

SUMMARY OF THE INVENTION

A tool is formed from a pair of concentric and relatively rotatable shafts, including an elongate tubular outer shaft, and an elongate inner shaft. A head assembly is formed from adjacent coaxial head elements. The inner shaft supports a forward head element and the outer shaft supports a rear head element. The head elements have the same cross-sectional profiles and cross-sectional dimensions.

An assembly is formed from a plunger and a tool. The plunger has a longitudinally extending socket bore that opens into an enlarged internal chamber. The tool is formed from a pair of concentric and relatively rotatable shafts, including an elongate tubular outer shaft, and an elongate inner shaft. A head assembly is formed from adjacent coaxial head elements. The inner shaft supports a forward head element and the outer shaft supports a rear head element. The head elements have the same cross-sectional profiles and cross-sectional dimensions. The forward head element is positioned within the internal chamber of the plunger and the rear head element is positioned within the socket bore of the plunger.

A method of repositioning a plunger situated within a housing entails inserting a tool within the housing through a housing bore. The tool is formed from a pair of concentric and relatively rotatable shafts, including an elongate tubular outer shaft, and an elongate inner shaft. A head assembly is formed from adjacent coaxial head elements. The inner shaft supports a forward head element and the outer shaft supports a rear head element. The head elements have the same cross-sectional profiles and cross-sectional dimensions.

The plunger has a longitudinal socket bore that opens into an enlarged internal chamber. The forward head element of the tool is closely but clearingly receivable within the socket bore.

After the tool is inserted within the housing, the forward head element is positioned within the internal chamber and the rear head element is positioned within the socket bore. The cross-sectional profiles of the head elements are aligned during this step. Next, the inner and outer shafts are relatively rotated until the cross-sectional profiles of the head elements are in skewed opposition, thereby locking the plunger to the tool. The locked tool and plunger are then at least partially withdrawn from the housing.

BRIEF DESCRIPTION OF THE DRAWINGS

FIG. 1 is a front elevation view of a positioning tool.

FIG. 2 is a bottom plan view of the tool shown in FIG. 1, taken along line 2-2. The inner and outer shafts are in their first position.

FIG. 3 is a front elevation view of the inner shaft of the tool shown in FIG. 1.

FIG. 4 is a cross-sectional view of the inner shaft shown in FIG. 3, taken along line 4-4.

FIG. 5 is a front elevation view of the outer shaft of the tool shown in FIG. 1.

FIG. 6 is a cross-sectional view of the outer shaft shown in FIG. 5, taken along line 6-6.

FIG. 10 is an end view of the plunger shown in FIG. 9, taken along line 10-10.

FIG. 11 is a cross-sectional view of the first end of the plunger shown in FIG. 10, taken along line 11-11.

FIG. 14 is a front elevation view of a collar element.

FIG. 16 is an end view of the collar element shown in FIG. 14, taken along line 16-16.

FIG. 19 is a cross-sectional view of a prior art pump within which the plunger shown in FIG. 9 has been installed. Ports and valves installed in the pump chamber have been omitted.

DETAILED DESCRIPTION

Figure 7:
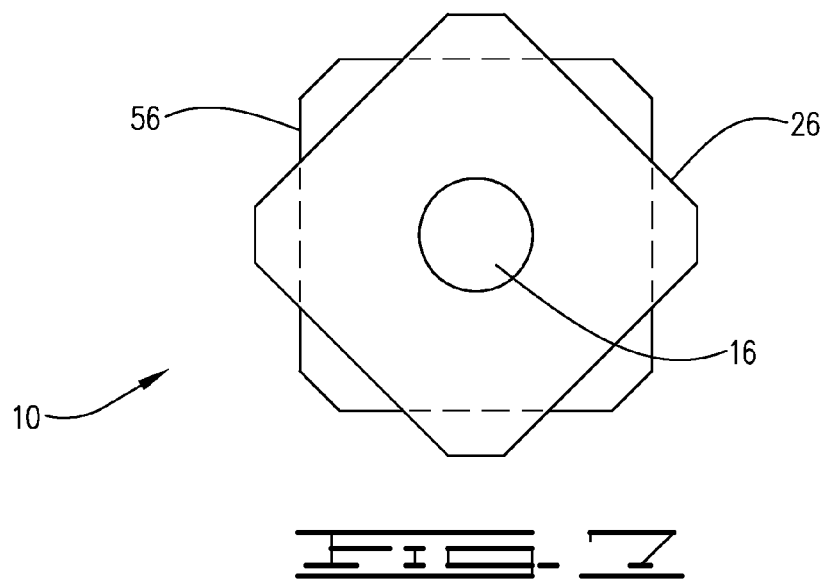
FIG. 7 is a bottom plan view of the same tool shown in FIG. 2. The inner and outer shafts are in their second position.

A plunger repositioning system comprises a tool 10, shown in FIGS. 1 and 2, having a first end 12 and an opposed second end 14. The tool 10 is formed from a pair of concentric and relatively rotatable shafts, including an elongate inner shaft 16, shown in FIGS. 3 and 4, and an elongate tubular outer shaft 18, shown in FIGS. 5 and 6. The inner shaft 16 has a length that exceeds that of the outer shaft 18 and is extendable within the tubular outer shaft 18.

As shown in FIG. 3, the inner shaft 16 has a first end 20 and an opposed second end 22. Preferably, the inner shaft 16 is shaped as a cylindrical solid along the major portion of its length. At its first end 20, the inner shaft 16 is provided with a pair of parallel faces 24. The paired faces 24 facilitate gripping of the inner shaft 16 with a tool, in order to apply a rotational force.

A forward head element 26 is installed on an extremity of the inner shaft 16 at its second end 22. The forward head element 26 is supported by the inner shaft 16 and is disposed in concentric relationship thereto. The forward head element 26 is characterized by a body 28 having a uniform cross-sectional profile. The body 28 is bounded laterally by a plurality of planar longitudinal side walls 30, and features a centrally disposed axial bore 32, shown in FIGS. 2 and 4, through which the inner shaft 16 extends.

Preferably, the body 28 is characterized by a polygonal cross-sectional profile. In the embodiment shown in the Figures, the forward head element 26 features an octagonal cross-sectional profile, with four major sides 34 of equal length, and four minor sides 36 of equal length. The ends of each adjacent pair of major sides 34 are joined by a minor side 36. Opposed major sides 34 extend in parallel relationship, as do opposed minor sides 36.

The forward head element 26 may be secured to the inner shaft 16 by welding, or by any other method that maintains forward head element 26 in an axially and radially fixed position at the second end 22 of the inner shaft 16. More preferably, forward head element 26 is secured to the inner shaft 16 by a roll pin (not shown) that extends through a radially-extending rectilinear passage (not shown) formed in the inner shaft 16 and an aligned rectilinear passage 38 formed in the forward head element 26.

The inner shaft 16 carries a floating annular spacer element 40 that is positioned immediately adjacent the forward head element 26. In one embodiment, the spacer element 40 is formed from bronze.

As shown in FIGS. 5 and 6, the outer shaft 18 is an elongate tubular structure having a first end 42, an opposed second end 44 and an internal bore 46 extending along its entire length. The outer shaft 18 preferably is cylindrical in shape along the major portion of its length, and is provided with external threads 48. Preferably, the threads 48 are Acme threads.

At its first end 42, the outer shaft 18 preferably includes a tubular upper section 50 having a polygonal cross-sectional profile. More preferably, the cross-sectional profile of the upper section 50 is hexagonal. Such an external shape facilitates gripping of the outer shaft 18 with a tool, such as crank 138, in order to apply a rotational force. A centrally disposed longitudinal bore (not shown) extends through the upper section 50. The bore is sized to allow the upper section 50 to closely but clearingly receive the inner shaft 16 adjacent its first end 20. The upper section 50 thus serves to maintain the inner shaft 16 in a central and axial position within the outer shaft 18.

A bushing 52 is installed within the outer shaft 18 at its second end 44. A centrally disposed longitudinal bore 54 extends through the bushing 52. The bore 54 is sized to allow the bushing 54 to closely but clearingly receive the inner shaft 16. The bushing 52 cooperates with the upper section 50 to maintain the inner shaft 16 in a central and axial position within the outer shaft 18.

A rear head element 56 is installed on an extremity of the outer shaft 18 at its second end 44. The rear head element 56 is supported by the outer shaft 18 and is disposed in concentric relationship thereto. The rear head element 56 is characterized by a body 58 having a uniform cross-sectional profile. The body 58 is bounded laterally by a plurality of planar longitudinal side walls 60, and features a centrally disposed axial bore (not shown), through which the outer shaft 18 closely but clearingly extends. The rear head element 56 is characterized by the same cross-sectional profile and cross-sectional dimensions as the forward head element 26.

The rear head element 56 may be secured to the outer shaft 18 by welding, or by any other method that maintains rear head element 56 in an axially and radially fixed position at the second end 44 of the outer shaft 18. More preferably, the rear head element 56 is secured to the outer shaft 18 by one or more set screws (not shown), each of which extends through a radially-extending rectilinear passage (not shown) formed in the outer shaft 18 and an aligned rectilinear passage 62 formed in the rear head element 56. In one embodiment, two such set screws are used to secure the rear head element 56 to the outer shaft 18.

The inner shaft 16 is coaxially inserted at its first end 20 into the second end 44 of the outer shaft 18. The inner shaft 16 is extended coaxially through the outer shaft 18, and positioned in concentric relation to the outer shaft 18. Extension continues until the rear head element 26 engages the spacer element 40, which maintains separation between the forward and rear head elements 26 and 56.

After the inner shaft 16 has been installed concentrically within the outer shaft 18, the shafts 16 and 18 are secured against relative longitudinal movement by a fastener. The fastener is installed adjacent the first end of the tool 10, as shown in FIG. 1, and preferably comprises a tubular cap element 64.

The cap element is provided with an internal bore (not shown) through which the inner shaft 16 is closely but clearingly received. The cap element 64 is secured to the inner shaft 16 by a roll pin (not shown) that extends through a radially-extending rectilinear passage (not shown) formed in the inner shaft 16 and an aligned rectilinear passage 66 formed in the cap element 64.

The cap element 64 engages the outer shaft 18 at its second end 44. The cap element 64 has maximum cross-sectional dimensions that exceed those of the internal bore 46 within outer shaft 18. Because the cap element 64 cannot enter the bore 46, it maintains the inner and outer shafts 16 and 18 in longitudinally fixed relationship. Alternately, the fastener may comprise a snap ring installed in a circumferential groove formed adjacent the upper end of the inner shaft.

When the inner and outer shafts 16 and 18 are assembled, the coaxially disposed head elements 26 and 56 form a head assembly 68.

By relative rotation, the inner and outer shafts 16 and 18 may be moved between a first position and a second position. Preferably, such relative rotation is carried out by applying a rotational force to the inner shaft 16 at its first end 20, while the outer shaft 18 remains static.

In the first position of the shafts, shown in FIG. 2, the cross-sectional profiles of the head elements are aligned. In the second position of the shafts, shown in FIG. 7, the cross-sectional profiles of the head elements are in skewed opposition. The second position is offset from the first position by a central angle having an apex that coincides with the longitudinal axis of the tool 10. This central angle is preferably 45 degrees.

Figure 8:
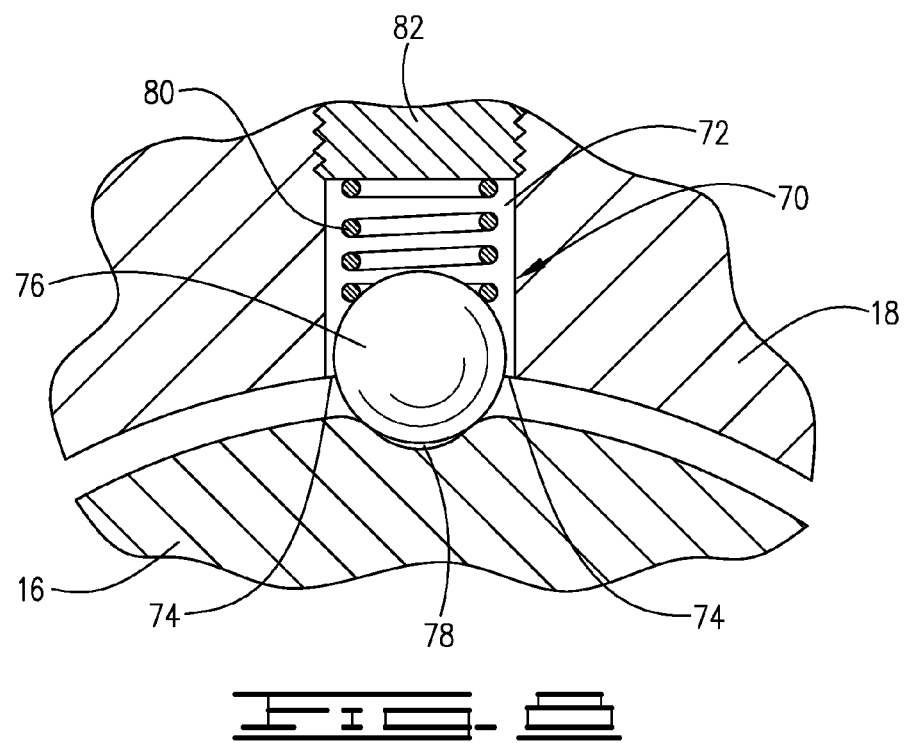
FIG. 8 is an enlarged cross-sectional view of a portion of the interface between the inner and outer shafts, showing the mechanism that resists relative rotation of the shafts at their second position.

As shown in FIG. 8, a mechanism 70 is formed at the interface between the inner and outer shafts 16 and 18. The mechanism 70 is adapted to resist relative rotation of the inner and outer shafts 16 and 18 at their second position, and preferably at their first position as well. The mechanism 70 comprises a passage 72 formed within the rear head element 56 and outer shaft 18. The passage terminates in an opening 74 in the outer shaft 18. Installed within the passage 72 is a ball 76 that is urged into a compact first depression 78 by a spring 80. A plug 82 engages the spring 80 and closes the passage 72 opposite opening 74.

The first depression 78 is formed in the exterior side of the inner shaft 16 near its second end 22, as shown in FIG. 4. The position of the first depression 78 is selected so that it aligns with the opening 74 when the shafts 16 and 18 are in their second position.

When the ball 76 is urged into the first depression 78, the mechanism 70 resists, but does not block, relative rotation of the shafts away from their second position. This resistance allows a user of the tool 10 to accurately locate the second position of the concentric shafts 16 and 18, even when the head assembly 68 is not visible. When sufficient relative rotational force is applied to the concentric shafts 16 and 18, they may be moved away from their second position.

The mechanism 70 preferably further comprises a compact second depression 84, having the same size and shape as the first depression 78. The second depression 84 is formed in the exterior side of the inner shaft 16 at the same longitudinal position as the first depression 78. The position of the second depression 84 is selected so that it aligns with the opening 74 when the shafts 16 and 18 are in their first position.

When the ball 76 is urged into the second depression 84, the mechanism 70 resists, but does not block, relative rotation of the shafts away from their first position. This resistance allows a user of the tool 10 to accurately locate the first position of the concentric shafts, even when the head assembly 68 is not visible. When sufficient relative rotational force is applied to the concentric shafts, they may be moved away from their first position.

As shown in FIG. 4, the depressions 78 and 84 are offset by a central angle 86 having an apex that coincides with the longitudinal axis 88 of the inner shaft 16. The central angle 86 is equal to the angular offset of the first and second positions, and is preferably 45 degrees.

In one embodiment, components of the tool 10 are formed from a strong and durable material, such as mild steel. The inner shaft has a length of 15.5 inches and a diameter of 0.5 inches. The outer shaft has a length of 13 inches, and is provided with an Acme thread having a diameter of 1.25 inches. The length of the head assembly 68, including both head elements, is 2.07 inches. The bushing 52 is 1 inch long and its internal bore has a diameter of 0.5 inches.

Figure 9:
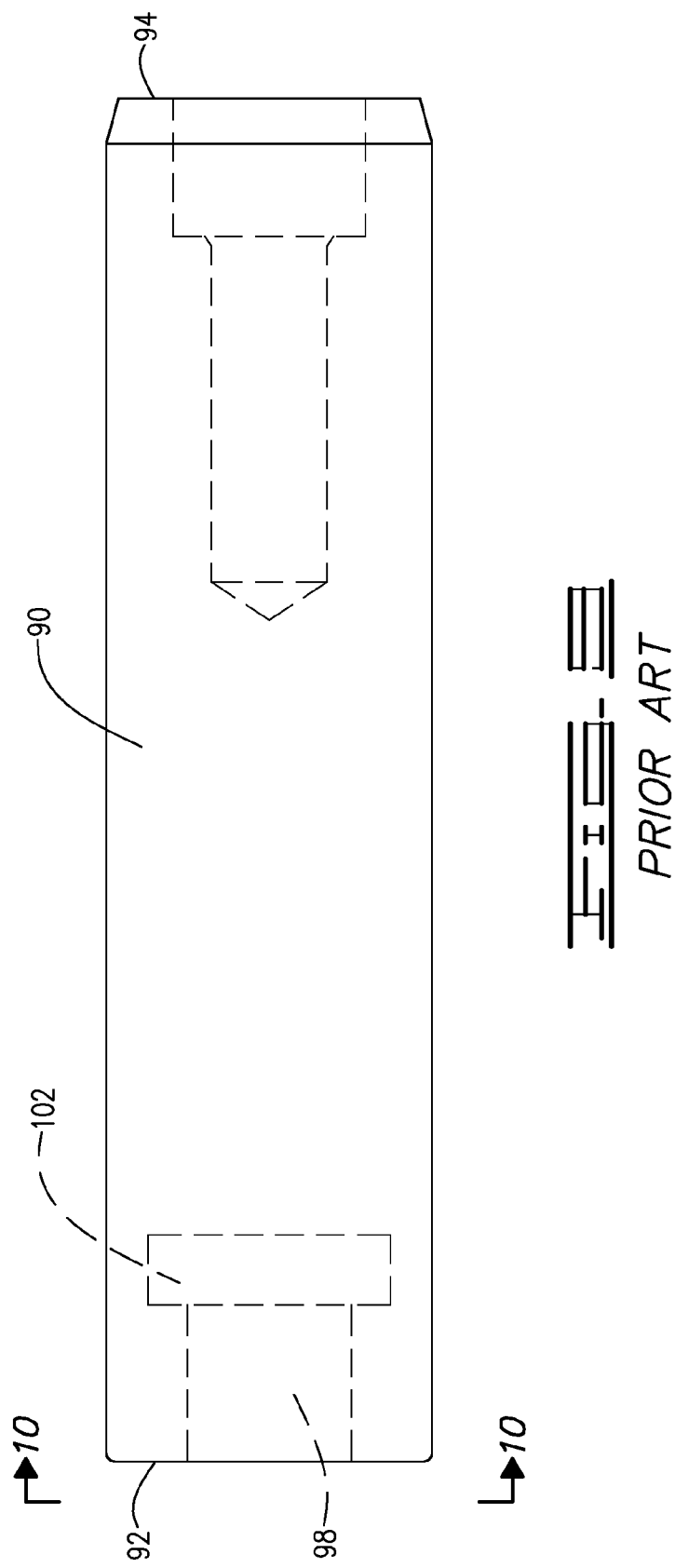
FIG. 9 is a front elevation view of a prior art plunger.

The tool 10 is adapted to reposition a plunger 90, shown in FIGS. 9-11. The plunger 90 has a generally cylindrical shape, with a first end 92 and opposed second end 94. Formed in the first end 92 of plunger 90 is a longitudinally extending socket 96. The socket 96 is characterized by an externally-opening socket bore 98 and an enlarged internal chamber 102.

The socket bore 98 is characterized by plural planar side walls 100. Opposite its external opening, the socket bore 98 opens into the internal chamber 102. Preferably, the socket bore 98 has a cross-sectional profile that is complementary to those of the forward and rear head elements 26 and 56.

The internal chamber 102 is bounded by an upper wall 104 and a parallel lower wall 106. The internal chamber 102 should have maximum cross-sectional dimensions that exceed those of the socket bore 98. Preferably, the internal chamber 102 is characterized by a cylindrical shape.

An internally threaded bore is formed in the second end 94 of the plunger 90. Within this bore, a threaded connection is formed between plunger 90 and a coaxial rod 108, shown in FIG. 19.

In one embodiment, the length of the plunger 90 is 12.563 inches, and its diameter is 3.0 inches. The total depth of socket 96 is 2.07 inches, and the length of socket bore 98 is 1.42 inches. The maximum cross-sectional dimension of socket bore 98 is 1.57 inches, while the diameter of internal chamber 102 is 1.938 inches.

Figure 12:
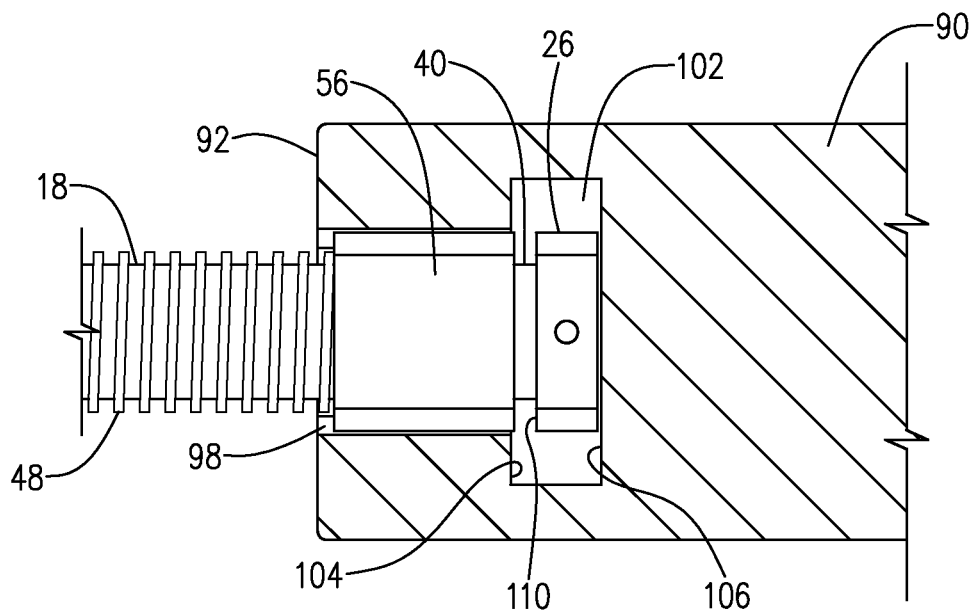
FIG. 12 is another cross-sectional view of the plunger shown in FIG. 11. The head assembly of the tool has been inserted into the plunger socket. The inner and outer shafts are in their first position, so that the cross-sectional profiles of the head elements are aligned.
Figure 13:
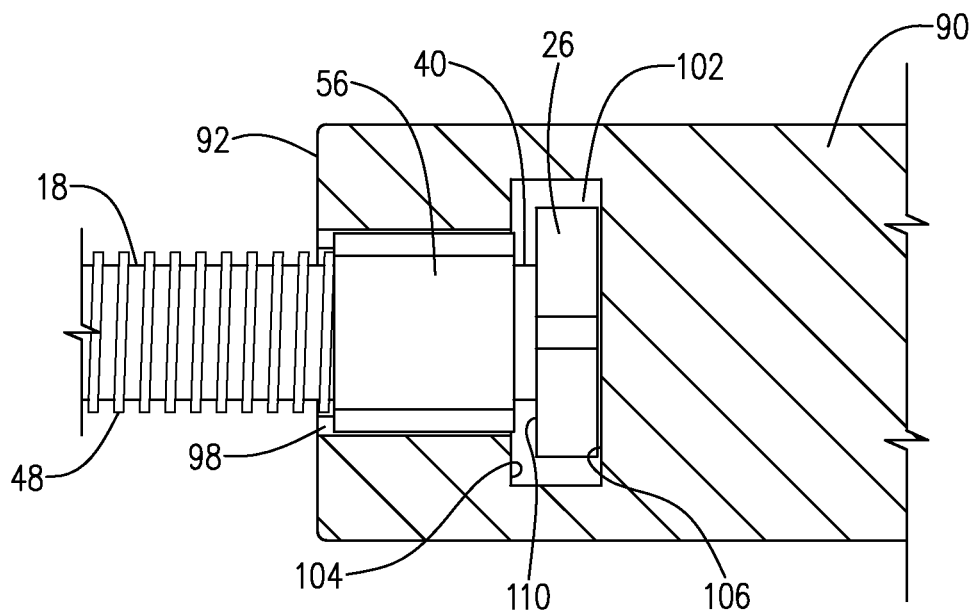
FIG. 13 is another cross-sectional view of the plunger shown in FIG. 11. The head assembly of the tool remains within the plunger socket. The inner and outer shafts are in their second position, so that the cross-sectional profiles of the head elements are skewed.

FIGS. 12 and 13 show the head assembly 68 of the tool 10 in an inserted position within the socket 96 of plunger 90. The cross-sectional shape and cross-sectional dimensions of the forward head element 26 are selected so that it may pass closely, but clearingly, through the socket bore 98 during insertion. When insertion is complete, the forward head element 26 of the tool is fully contained within the internal chamber 102. At this point, the rear head element 56 is lodged closely, but clearingly, within the socket bore 98, while remaining entirely outside of internal chamber 102. The dimensions of the head elements 26 and 56 are chosen so as to enable the tool 10 and plunger 90 to assume this configuration.

In FIG. 12, the shafts 16 and 18 are in their first position, so that the cross-sectional profiles of the head elements 26 and 56 are aligned. In this configuration, the head assembly 68 may be freely inserted into and removed from the socket 96 of plunger 90.

In FIG. 13, the shafts 16 and 18 are in their second position, so that the cross-sectional profiles of the head elements 26 and 56 are in skewed opposition. In this configuration, axial removal of forward head element 26 from internal chamber 102 is blocked by interference between the upper surface 110 of forward head element 56 and the upper wall 104 of the internal chamber 102. As a result, the tool 10 is locked to the plunger 90, and the two components can move together as a unit. These two components may be unlocked by returning the shafts 16 and 18 to their first position.

The tool 10 may rotated while its head assembly 68 is within the socket 96 of plunger 90. When such rotation of the tool 10 occurs, the planar side walls 60 of the rear head element 56 engage the facing side walls 100 of the socket bore 98. This causes the plunger 90 to rotate about its longitudinal axis. Such rotation can be used to unthread the second end 94 of the plunger 90 from its connecting rod 108.

Figure 15:
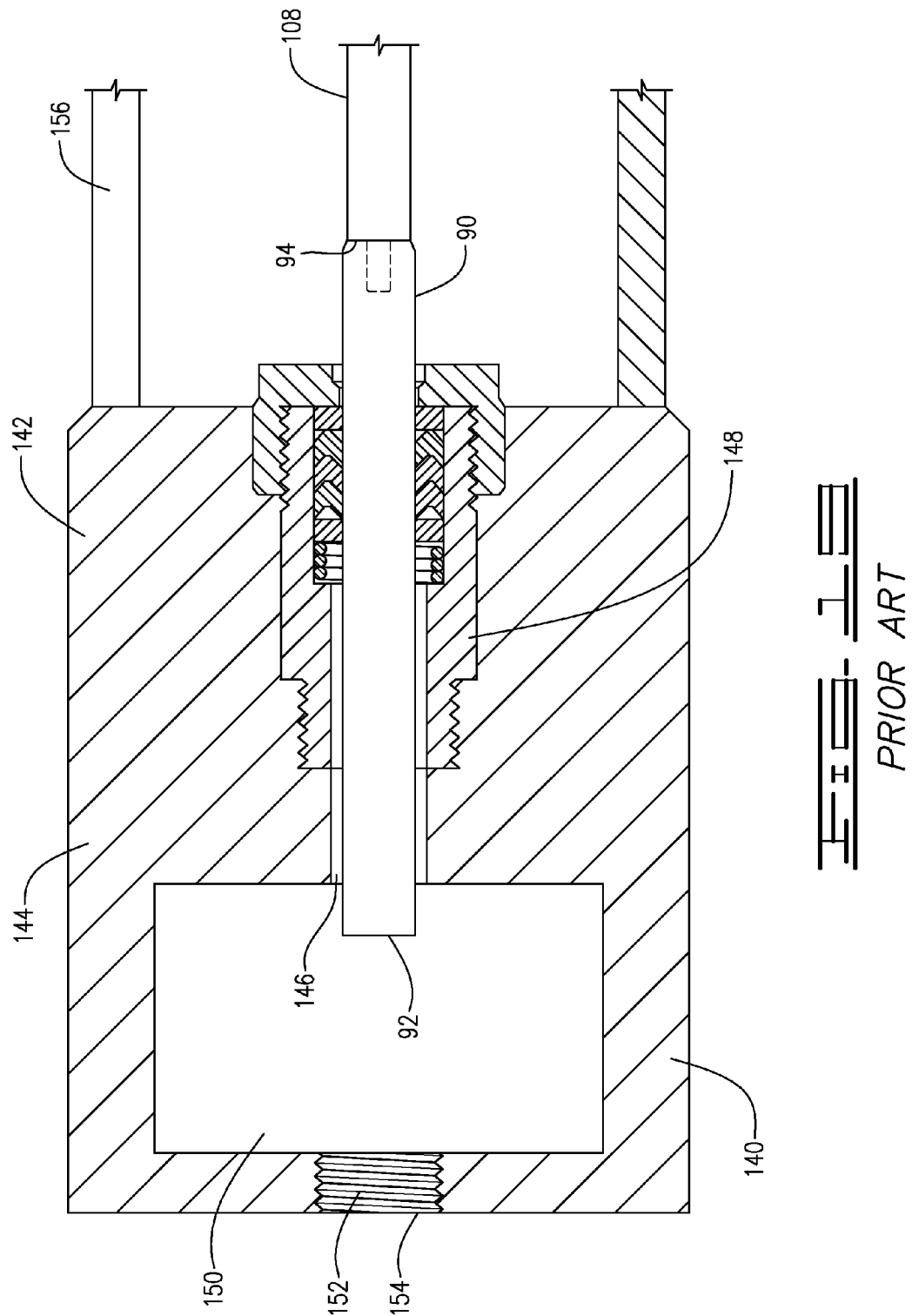
FIG. 15 is an end view of the collar element shown in FIG. 14, taken along line 15-15.

The plunger repositioning system further comprises a tubular collar element 112, shown in FIGS. 14-16, having a first end 114 and an opposed second end 116. An enlarged annular flange section 118 is formed at the first end 114 of the collar element 112. Axially extending external threads 120 are formed on the side walls of the flange section 118, which features a planar and annular face 122 at first end 114. Fastener openings 124 are formed in the face 122.

The flange section 118 is joined to a concentric stem section 126, which terminates at second end 116. The stem section 126 is preferably cylindrical in external shape, and has maximum cross-sectional dimensions that are less than those of the flange section 118. Preferably, the flange section 118 and stem section 126 are formed as a single piece of material.

The collar element 112 features an internal collar bore 128 that extends its entire length, through both the flange section 118 and stem section 126. The collar bore 128 is characterized by a uniform and preferably circular cross-sectional profile. The dimensions of the collar bore 128 are selected so that it may closely but clearingly receive the plunger 90.

In one embodiment, the collar element 112 is formed from 6061-T6 aluminum alloy. The length of collar element 112 is 6 inches. The length of the flange section 118 is 2.03 inches, and its diameter is 5 inches. The length of the stem section 126 is 3.97 inches and its diameter is 3.475 inches. The diameter of the collar bore is 3.01 inches. The collar element 112 is anodized and coated with Teflon.

Figure 17:
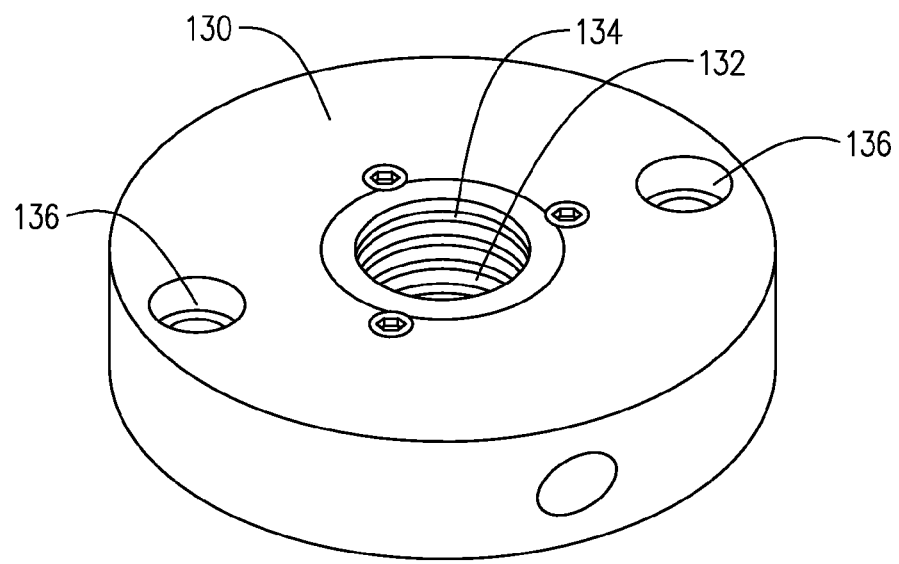
FIG. 17 is a perspective view of a platform element.

The plunger repositioning system further comprises a disc-shaped platform element 130, shown in FIG. 17. The platform element 130 is adapted for coaxial engagement with the collar element 112 at its flange section 118. The platform element is preferably characterized by a circular cross-sectional profile, and features a centrally disposed axial platform bore 132 extending therethrough.

The platform bore 132 is sized to closely but clearingly receive the outer shaft 18 of tool 10. Internal threads 134 formed within the platform bore 132 mate with the external threads 48 formed on the outer shaft 18. Fastener openings 136 formed in platform element 130 register with the fastener openings 124 formed in the annular face 122 of the collar element 112.

In one embodiment, the platform element 130 is formed from 6061-T6 aluminum alloy. It has a diameter of 4.9 inches and a height of 1.25 inches. The platform element 130 is anodized and coated with Teflon.

Figure 18:
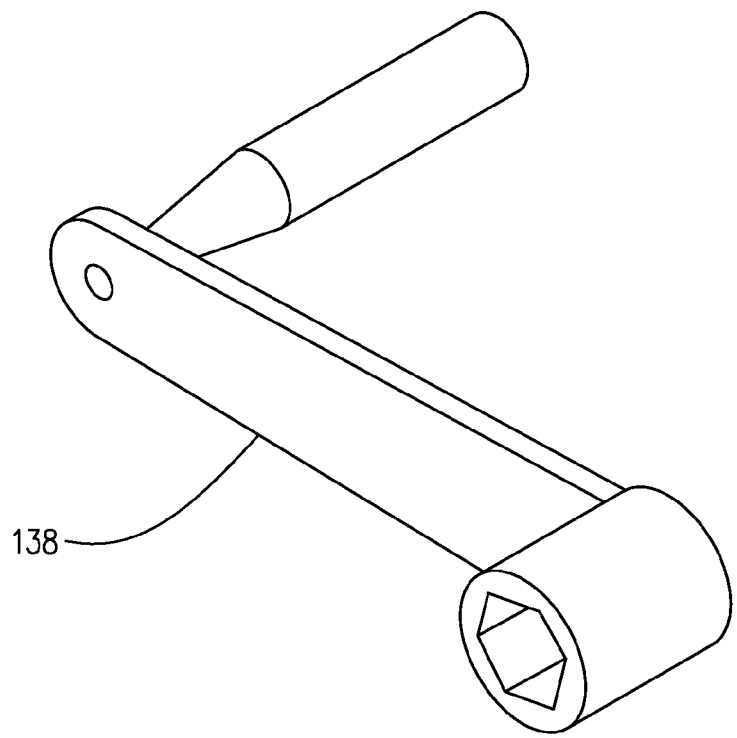
FIG. 18 is a perspective view of a crank.

The plunger repositioning system further comprises a crank 138, shown in FIG. 18. The crank 138 is adapted to apply a rotational force to the tool 10, at the upper section 50 of outer shaft 18.

FIG. 19 shows a plunger 90 situated within the fluid end 140 of a pump 142 having a housing 144. The plunger 90 is connected at its second end 94 by internal threads to a rod 108 that is mechanically engaged with the power end (not shown) of the pump 142. The rod 108 may comprise a pony rod.

Under power, the plunger 90 reciprocates within a longitudinal plunger bore 146 formed within the housing 144. Positioned within the plunger bore 146 is a stuffing box 148 through which the plunger 90 can move. The stuffing box 148 forms a seal between the fluid end 140 and the power end of the pump 142.

The plunger bore 146 opens into a pump chamber 150 formed within the housing 144. A housing bore 152 is formed in the housing 144 and aligns with the plunger bore 146. The housing bore 152 is internally threaded and features an external opening 154. In one embodiment, the housing bore 152 is 5 inches in diameter and provided with a 45°/7° buttress thread. The housing bore 152 is normally closed by an externally threaded cover (not shown) that is installed within the housing bore 152 through opening 154.

During operation of the pump 142, reciprocation of the plunger 90 causes the seals within the stuffing box 148 to wear. In order to keep the pump 142 operating efficiently, these seals must be replaced periodically. Such replacement cannot occur until the plunger 90 is repositioned, by disconnecting it from rod 108 and withdrawing it from the stuffing box 148. Only then can the stuffing box 148 be accessed through service port 156.

Figure 20:
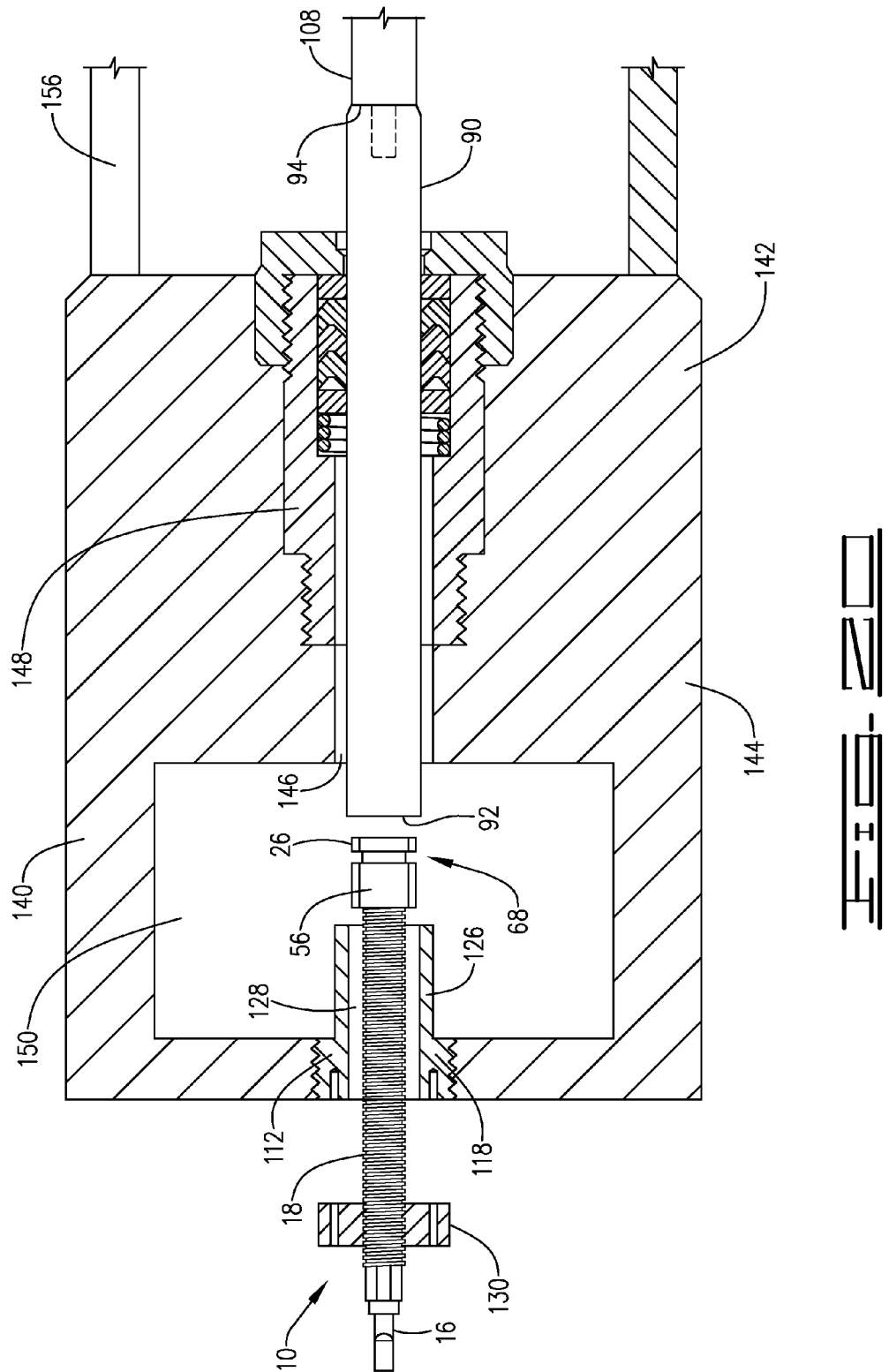
FIG. 20 is another cross-sectional view of the pump shown in FIG. 19, illustrating a first stage of repositioning the plunger. A collar element has been installed in the housing bore. The tool shown in FIG. 1 has been extended through the collar bore and into the pump chamber to a position adjacent the plunger.

FIG. 20 shows the first stage of repositioning the plunger 90. The cover has been removed from housing bore 152, and collar element 112 has been installed within the housing bore 152. Installation of the collar element 112 is carried out by first inserting the stem section 126 into external opening 154, and then extending it through the housing bore 152 and into the pump chamber 150. The connected flange section 118 is then rotated until it is engaged within the housing bore 152. The external threads 120 on flange section 118 mate with the internal threads 134 formed within the housing bore 152.

The flange section 118 has the same depth as the housing bore 152, and is fully contained within the housing bore 152 when installed. The installed stem section 126 cantilevers within the pump chamber 150, and aligns with the plunger bore 146.

The tool 10 is next inserted, head assembly 68 first, through the collar bore 128 and into the pump chamber 150. The shafts 16 and 18 are preferably in their first position when this step is performed.

Figure 21:
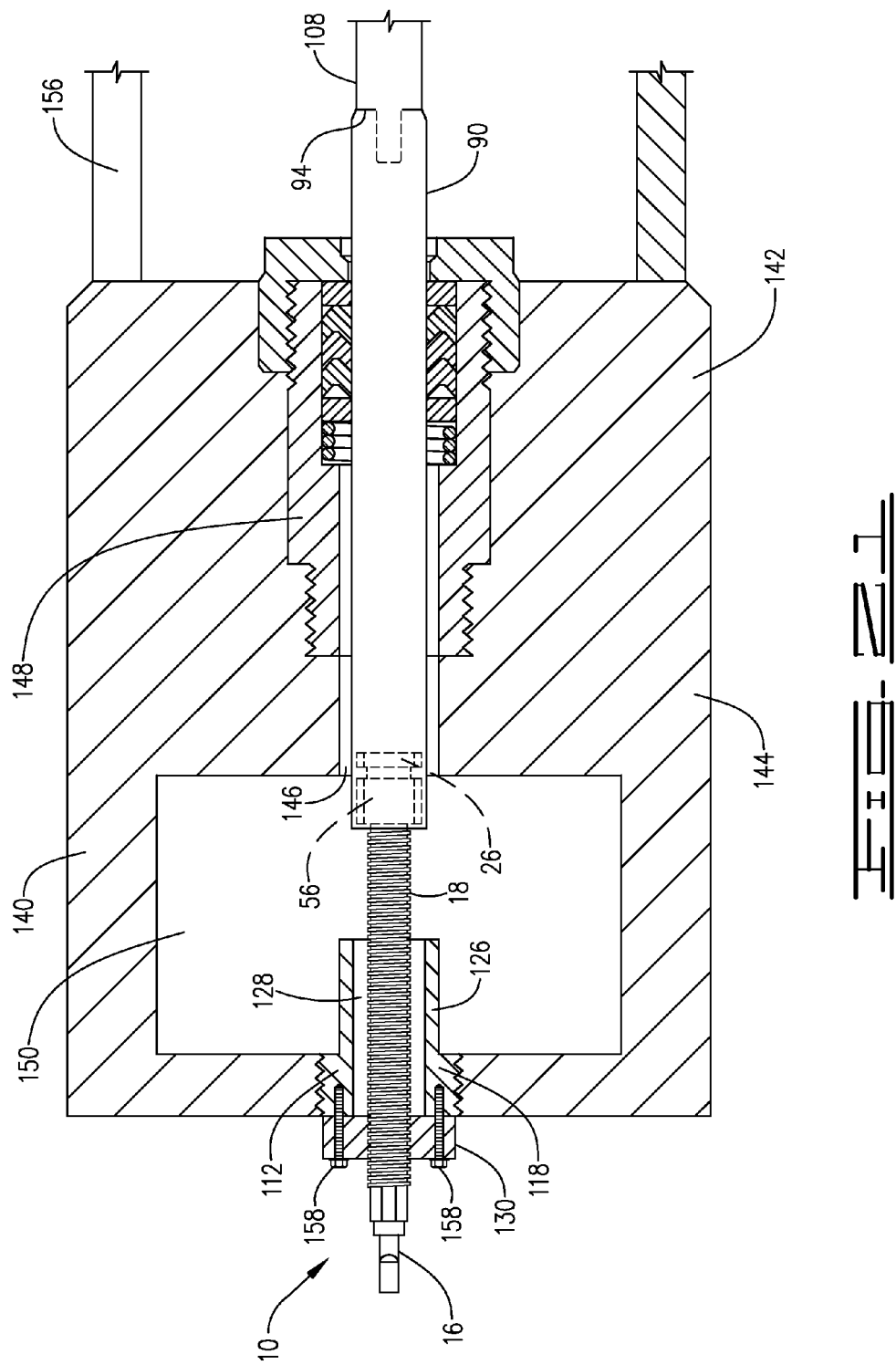
FIG. 21 is another cross-sectional view of the pump shown in FIG. 19, illustrating a second stage of repositioning the plunger. The head assembly of the tool has been fully inserted into the socket of the plunger. The shafts of the tool are in their first position.

As shown in FIG. 21, the head assembly 68 is next inserted into the socket 96 formed at the first end 92 of plunger 90. While the shafts are in their first position, the forward head element 26 is positioned within the internal chamber 102 and the rear head element 56 is positioned within the socket bore 98.

The shafts 16 and 18 are next relatively rotated to their second position, so that the cross-sectional profiles of the head elements 26 and 56 are in skewed opposition. As a result, the plunger 90 is locked to the tool 10. This configuration of the head elements is shown in FIG. 12.

A user of the tool 10 cannot see the forward head element 26 within the pump chamber 150, and thus cannot visually confirm that the shafts 16 and 18 have reached their second position. However, the resistance to rotation provided by the mechanism 70 allows the second position to be reached accurately without need for visual access.

As shown in FIGS. 20 and 21, platform element 130 is carried on the outer shaft 18 of the tool 10. Preferably the platform element 130 is threaded onto the outer shaft 18 before the tool 10 is inserted into pump chamber 150. The platform element 130 should not be secured to the collar element 112 until after the head assembly 68 has been inserted into the plunger 90, and the forward head element 26 positioned within the internal chamber 102 of the socket 96.

The platform element 130 is next rotated on threaded outer shaft 18 until it is disposed in face-to-face engagement with the collar element 112, at the face 122 of flange section 118. The platform element 130 is secured in place with fasteners 158 that extend through the aligned fastener openings 124 and 136. This configuration is shown in FIG. 21. The fasteners 158 may comprise bolts.

When the platform element 130 is secured to the collar element 112, the outer shaft 18 is securely supported in coaxial alignment with the housing bore 152 and the plunger bore 146. The plunger 90 is in turn securely locked to outer shaft 18 by the head assembly 68.

Rotational force is next applied to the tool 10 at outer shaft 18, preferably using crank 138 at upper section 50. This rotational force disconnects the locked plunger 90 from rod 108. Although considerable force may be required to break the threaded connection between plunger 90 and rod 108, the plunger 90 remains securely supported on outer shaft 18 as the connection is broken. As a result, the plunger 90 does not fall into the pump chamber 150, nor does it strike the housing 144 or other components of the pump 142. Either occurrence can produce plunger damage that can interfere with efficient operation of the pump 142.

Figure 22:
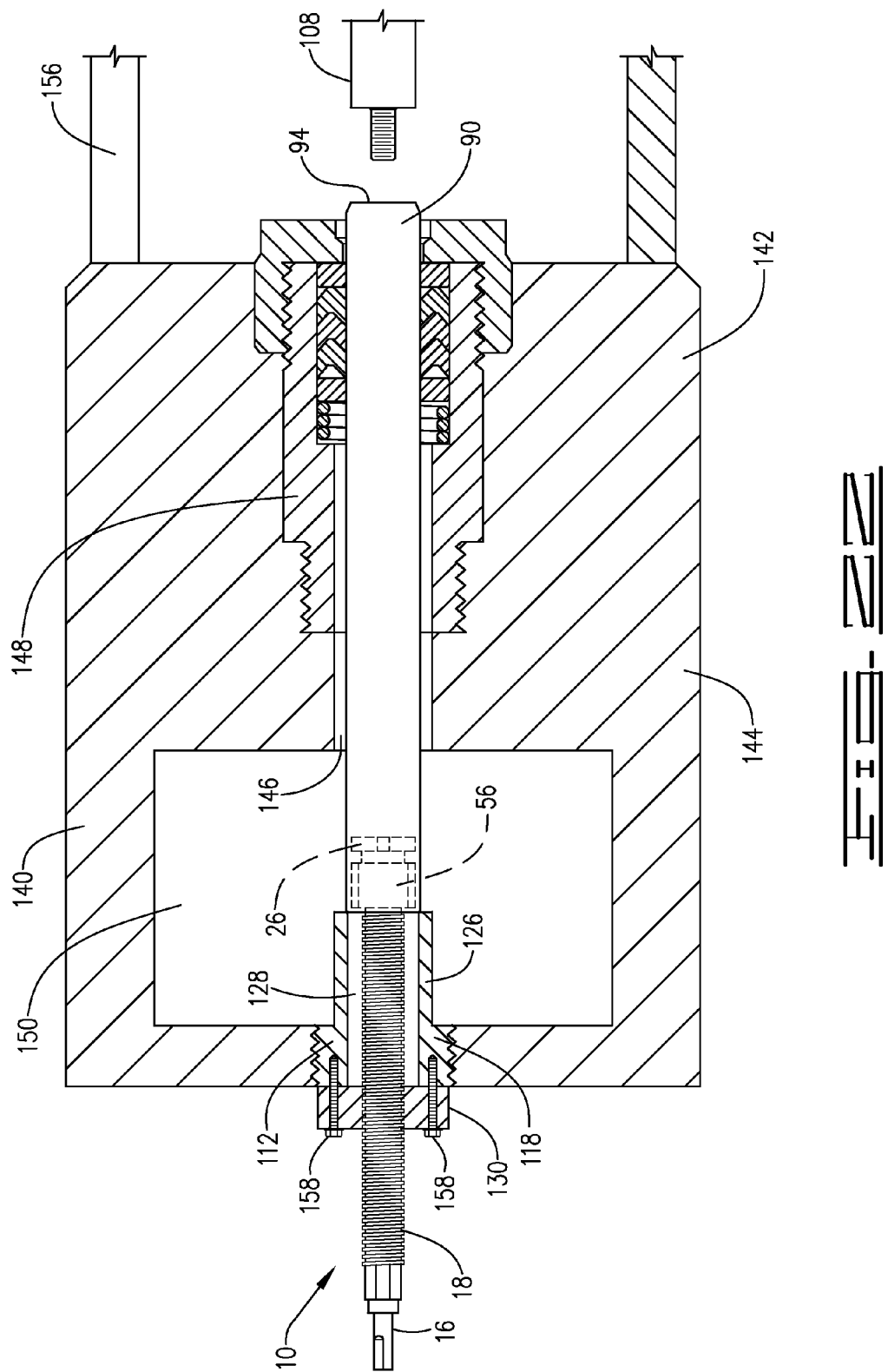
FIG. 22 is another cross-sectional view of the pump shown in FIG. 19, illustrating a third stage of repositioning the plunger. The head assembly of the tool remains inserted within the socket of the plunger. The shafts of the tool have undergone relative rotation to their second position, locking the plunger to the tool. The tool has been rotated at its outer shaft to break the threaded connection between the plunger and its adjoining rod. The locked tool-plunger assembly is being withdrawn from the housing.

Once the connection with rod 108 has been broken, the outer shaft 18 is further rotated to at least partially withdraw the locked tool 10 and plunger 90 from the housing 144. This stage of the repositioning process is shown in FIG. 22. If desired, the plunger 90 may next be fully withdrawn from the pump 142 by disconnecting the platform element 130 from collar element 112 and withdrawing the locked tool-plunger assembly.

Alternately, the platform element 130 may be maintained in engagement with collar element 112, and the outer shaft 18 rotated until the plunger 90 is positioned outside the stuffing box 148. Access to the stuffing box 148 may then be conveniently gained through service port 156 while the plunger 90 remains suspended on outer shaft 18 within the pump chamber 150.

The plunger 90 is reinstalled within plunger bore 146 and reconnected to rod 108 by reversing the steps just described.

Any two or more of the components described herein, aside from the plunger 90, pump 142 and its components, may be collected to form a kit. Such a kit may include one or more of the tool 10 and its components, the collar element 112, the platform element 130, and the crank 138. Kit components may be unassembled, partially assembled or fully assembled.

Changes may be made in the construction, operation and arrangement of the various parts, elements, steps and procedures described herein without departing from the spirit and scope of the invention as described in the following claims.

The invention claimed is:

1. A tool, comprising:
   a pair of concentric and relatively rotatable shafts, comprising:
      an elongate tubular outer shaft; and
      an elongate inner shaft; and
   a head assembly formed from adjacent coaxial head elements, comprising:
      a forward head element supported by the inner shaft; and
      a rear head element supported by the outer shaft and having the same cross-sectional profile and cross-sectional dimensions as the forward head element.

2. The tool of claim 1 in which the shafts are relatively rotatable between a first position in which the cross-sectional profiles of the head elements are aligned, and a second position, in which the cross-sectional profiles of the head elements are in skewed opposition.

3. The tool of claim 2 further comprising:
   a mechanism adapted to resist relative rotation of the inner and outer shafts at the second position.

4. A kit, comprising:
   the tool of claim 1;
   a tubular collar element having a flange section formed at one end;
   a platform element adapted for coaxial engagement with the collar element at its flange section, the platform element having a centrally disposed platform bore extending therethrough.

5. The kit of claim 4 in which the shafts of the tool are relatively rotatable between a first position in which the cross-sectional profiles of the head elements are aligned, and a second position, in which the cross-sectional profiles of the head elements are in skewed opposition.

6. The kit of claim 5 in which the tool further comprises:
   a mechanism adapted to resist relative rotation of the inner and outer shafts at the second position.

7. The kit of claim 4 in which the platform bore is characterized by internal threads that mate with external threads formed on the outer shaft.

8. The kit of claim 7 in which the shafts of the tool are relatively rotatable between a first position in which the cross-sectional profiles of the head elements are aligned, and a second position, in which the cross-sectional profiles of the head elements are in skewed opposition.

9. The kit of claim 8 further comprising:
   a crank adapted to apply a rotational force to the outer shaft of the tool.

10. An assembly, comprising:
    a plunger having a longitudinally extending socket bore that opens into an enlarged internal chamber; and
    a tool, comprising:
       a pair of concentric and relatively rotatable shafts, comprising:
          an elongate and tubular outer shaft; and
          an elongate inner shaft; and
       a head assembly formed from adjacent coaxial head elements, comprising:
          a forward head element supported by the inner shaft; and
          a rear head element supported by the outer shaft and having the same cross-sectional profile and cross-sectional dimensions as the forward head element;
    in which the forward head element is positioned within the internal chamber of the plunger and the rear head element is positioned within the socket bore of the plunger.

11. The assembly of claim 10 in which the shafts of the tool are relatively rotatable between a first position in which the cross-sectional profiles of the head elements are aligned, and a second position, in which the cross-sectional profiles of the head elements are in skewed opposition.

12. The assembly of claim 11 further comprising:
    a mechanism adapted to resist relative rotation of the inner and outer shafts at the second position.

13. The assembly of claim 10 further comprising:
    a housing within which the plunger is situated, the housing having a housing bore through which the plunger is accessible;
    a tubular collar element installed within the housing bore; and
    a platform element installed on the outer shaft of the tool, such that the outer shaft extends closely but clearingly through a centrally disposed opening formed in the platform element, in coaxial relationship to the collar element and the housing bore.

14. The assembly of claim 13 in which the shafts of the tool are relatively rotatable between a first position in which the cross-sectional profiles of the head elements are aligned, and a second position, in which the cross-sectional profiles of the head elements are in skewed opposition.

15. The assembly of claim 13 in which the platform bore is characterized by internal threads that mate with external threads formed on the outer shaft.

16. The assembly of claim 15 in which the shafts of the tool are relatively rotatable between a first position in which the cross-sectional profiles of the head elements are aligned, and a second position, in which the cross-sectional profiles of the head elements are in skewed opposition.

17. The assembly of claim 16 further comprising:
    a mechanism adapted to resist relative rotation of the inner and outer shafts at the second position.

18. A method of repositioning a plunger situated within a housing, the plunger having a longitudinal socket bore opening into an enlarged internal chamber, comprising:
    inserting a tool within the housing through a housing bore, the tool comprising:
       a pair of concentric and relatively rotatable shafts, comprising:
          an elongate and tubular outer shaft; and
          an elongate inner shaft; and
       a head assembly formed from adjacent coaxial head elements, comprising:
          a forward head element supported by the inner shaft, the forward head element closely but clearingly receivable within the socket bore; and
          a rear head element supported by the outer shaft and having the same cross-sectional profile and cross-sectional dimensions as the forward head element;
    positioning the forward head element within the internal chamber and the rear head element within the socket bore while the cross-sectional profiles of the head elements are aligned;
    relatively rotating the inner and outer shafts until the cross-sectional profiles of the head elements are in skewed opposition, thereby locking the plunger to the tool; and
    at least partially withdrawing the locked tool and plunger from the housing.

19. The method of claim 18 further comprising:
    installing a tubular collar element within the housing bore; and
    installing a platform element on the outer shaft of the tool, such that the outer shaft extends closely but clearingly through a centrally' disposed opening formed in the platform element, in coaxial relationship to the collar element and the housing bore.

20. The method of claim 19 further comprising:
securing the platform element in face-to-face engagement with the collar element, after the forward head element has been positioned within the internal chamber of the socket.

21. The method of claim 19 in which the platform bore is characterized by internal threads that mate with external threads formed on the outer shaft, and in which withdrawal of the tool and locked plunger is carried out by axially rotating the outer shaft.

* * * * *